(12) United States Patent
Hemo et al.

(10) Patent No.: US 11,070,397 B2
(45) Date of Patent: Jul. 20, 2021

(54) ADAPTIVE OTA LEAKAGE CANCELLATION FOR MMWAVE RADAR

(71) Applicant: QUALCOMM Incorporated, San Diego, CA (US)

(72) Inventors: Evyatar Hemo, Kiryat Bialik (IL); Evgeny Levitan, Haifa (IL); Ariel Yaakov Sagi, Haifa (IL); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/502,958

(22) Filed: Jul. 3, 2019

(65) Prior Publication Data

US 2020/0295972 A1    Sep. 17, 2020

Related U.S. Application Data

(60) Provisional application No. 62/819,128, filed on Mar. 15, 2019.

(51) Int. Cl.
*H04L 25/02* (2006.01)
*H04B 7/0408* (2017.01)
*H04B 17/354* (2015.01)
*H04B 1/525* (2015.01)

(52) U.S. Cl.
CPC ......... *H04L 25/0212* (2013.01); *H04B 1/525* (2013.01); *H04B 7/0408* (2013.01); *H04B 17/354* (2015.01)

(58) Field of Classification Search
CPC ... H04L 25/0212; H04B 17/354; H04B 1/525; H04B 7/0408

USPC .......................................................... 375/262
See application file for complete search history.

(56) References Cited

U.S. PATENT DOCUMENTS

| | | | | |
|---|---|---|---|---|
| 6,084,540 | A  * | 7/2000 | Yu | G01S 3/28 342/13 |
| 2007/0155336 | A1* | 7/2007 | Nam | H04B 7/0639 455/69 |
| 2008/0007454 | A1* | 1/2008 | Minkoff | H04L 25/03006 342/379 |
| 2014/0274212 | A1* | 9/2014 | Zurek | H04M 1/6041 455/563 |
| 2015/0155899 | A1* | 6/2015 | Webb | H04B 1/525 455/303 |
| 2017/0205502 | A1* | 7/2017 | Honma | G01S 7/415 |
| 2018/0115342 | A1* | 4/2018 | Doane | H04B 1/44 |
| 2018/0309502 | A1* | 10/2018 | Khandani | H04B 7/15557 |
| 2019/0222296 | A1* | 7/2019 | Khandani | H04B 7/15585 |
| 2020/0145042 | A1* | 5/2020 | Kulkarni | H04L 25/0212 |

* cited by examiner

*Primary Examiner* — Kevin M Burd
(74) *Attorney, Agent, or Firm* — Thien T. Nguyen

(57) ABSTRACT

Techniques provided herein are directed toward enabling short-range proximity detection using radar sensors by reducing or eliminating OTA leakage. Embodiments generally include performing spatial cancellation by using a plurality of transmit/receive pairs of antenna elements to implement analog and/or digital leakage cancellation on the transmit and/or receive side. According to some embodiments null space projection cancellation, OTA leakage tracking, or adaptive minimum variance distortionless response (MVDR) beamforming may be performed to help preserve of the OTA leakage cancellation efficacy over time.

28 Claims, 10 Drawing Sheets

ADAPTIVE OTA LEAKAGE CANCELLATION FOR MMWAVE RADAR

RELATED APPLICATIONS

This application claims the benefit of U.S. Provisional Application No. 62/819,128, filed Mar. 15, 2019, entitled ADAPTIVE OTA LEAKAGE CANCELLATION FOR MMWAVE RADAR", which is assigned to the assignee hereof, and incorporated herein in its entirety by reference.

BACKGROUND

Radar sensors can be used by electronic devices, such as mobile phones, to sense targets at small distances using radio frequency (RF) signals. These sensors can include and operate two separate parallel components: one for the receive side (Rx) and the other for the transmit side (Tx). In many instances, the echo from the nearby targets can often be received by the Rx side before the Tx side finishes its transmission. Accordingly, radar sensors may need to operate in full-duplex mode, in which the both Tx and Rx sides operate simultaneously, to sense nearby targets.

One of the most significant challenges of full-duplex mode is the Over The Air (OTA) leakage from Tx to Rx. That is, the Rx side not only receives the desired reflected echo from a, but also receives undesired direct path propagating over the air from Tx to Rx directly. This direct OTA leakage is usually much stronger than the desired signal (due to the close proximity between the Rx and Tx antennas) which makes it very challenging to detect the desired signal. Due to this leakage, standard radar sensors typically have a "blind spot" for smaller ranges.

BRIEF SUMMARY

Techniques provided herein are directed toward enabling short-range proximity detection using radar sensors by reducing or eliminating OTA leakage. Embodiments generally include performing spatial cancellation by using a plurality of transmit/receive pairs of antenna elements to implement analog and/or digital leakage cancellation on the transmit and/or receive side. According to some embodiments null space projection cancellation, OTA leakage tracking, or adaptive minimum variance distortionless response (MVDR) beamforming may be performed to help preserve of the OTA leakage cancellation efficiency over time.

An example method of performing proximity detection using radio frequency (RF) signals at an electronic device, according to the description, comprises obtaining a plurality of Channel Impulse Response (CIR) measurements at least in part by, for each transmit/receive pair of a plurality of transmit/receive pairs of antenna elements of the electronic device, transmitting, with transmit circuitry of the electronic device, a respective RF signal, and obtaining, with receive circuitry of the electronic device, a CIR measurement by taking a plurality of samples of the respective RF signal. At least a portion of the plurality of samples of the respective RF signal are taken during the transmitting of the respective RF signal. The method further comprises performing spatial cancellation of Over The Air (OTA) leakage between the transmit circuitry and the receive circuitry, and subsequent to performing the spatial cancellation, determining a proximity of a target, based at least in part on the plurality of CIR measurements.

An example electronic device for performing proximity detection using radio frequency (RF) signals, according to the description, comprises antenna elements comprising one or more transmit antenna elements, and one or more receive antenna elements. The one or more transmit antenna elements and the one or more receive antenna elements comprise a plurality of transmit/receive pairs of antenna elements. The electronic device further comprises transmit circuitry communicatively coupled with the one or more transmit antenna elements, receive circuitry communicatively coupled with the one or more receive antenna elements, and a processing unit communicatively coupled with the transmit circuitry and receive circuitry. The processing unit is configured to obtain a plurality of Channel Impulse Response (CIR) measurements at least in part by, for each transmit/receive pair of a plurality of transmit/receive pairs of antenna elements of the electronic device, causing the transmit circuitry to transmit a respective RF signal, and causing the receive circuitry to obtain a CIR measurement by taking a plurality of samples of the respective RF signal. At least a portion of the plurality of samples of the respective RF signal are taken during the transmitting of the respective RF signal. The processing unit is further configured to perform spatial cancellation of Over The Air (OTA) leakage between the transmit circuitry and the receive circuitry, and subsequent to performing the spatial cancellation, determine a proximity of a target, based at least in part on the plurality of CIR measurements.

Another example device for performing proximity detection using radio frequency (RF) signals, according to the description, comprises means for obtaining a plurality of Channel Impulse Response (CIR) measurements at least in part by, for each transmit/receive pair of a plurality of transmit/receive pairs of antenna elements of the device transmitting, with transmission means of the device, a respective RF signal, and obtaining, with reception means of the device, a CIR measurement by taking a plurality of samples of the respective RF signal. At least a portion of the plurality of samples of the respective RF signal are taken during the transmitting of the respective RF signal. The device further comprises means for performing spatial cancellation of Over The Air (OTA) leakage between the transmission means and the reception means, and means for determining a proximity of a target, subsequent to performing the spatial cancellation, based at least in part on the plurality of CIR measurements.

An example non-transitory computer-readable medium, according to the description, has instructions stored therein for performing proximity detection using radio frequency (RF) signals. The instructions, when executed by one or more processing units, cause the one or more processing units to obtain a plurality of Channel Impulse Response (CIR) measurements at least in part by, for each transmit/receive pair of a plurality of transmit/receive pairs of antenna elements of an electronic device, transmitting, with transmit circuitry of the electronic device, a respective RF signal, and obtaining, with receive circuitry of the electronic device, a CIR measurement by taking a plurality of samples of the respective RF signal. At least a portion of the plurality of samples of the respective RF signal are taken during the transmitting of the respective RF signal. The instructions, when executed by one or more processing units, further cause the one or more processing units to perform spatial cancellation of Over The Air (OTA) leakage between the transmit circuitry and the receive circuitry, and determine a proximity of a target, subsequent to performing the spatial cancellation, based at least in part on the plurality of CIR measurements.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

It can be noted that, as used herein, the terms "beamforming," and "beam steering" may be used interchangeably to refer to directional transmission and/or reception of RF signals. As noted in further detail below, such processes can be implemented in analog and/or digital circuitry, and may be implemented at the Tx and/or Rx side. Additionally, the term "spatial cancellation" refers to all types of leakage cancellation that exploit difference in spatial signature of target and OTA leakage signal. As such, "spatial cancellation" refers to all types of leakage cancellation described herein, including analog beamforming, null space projection cancellation (abbreviated herein as "NSPC") and minimum variance distortionless response (MVDR) beamforming.

Figure 1A:
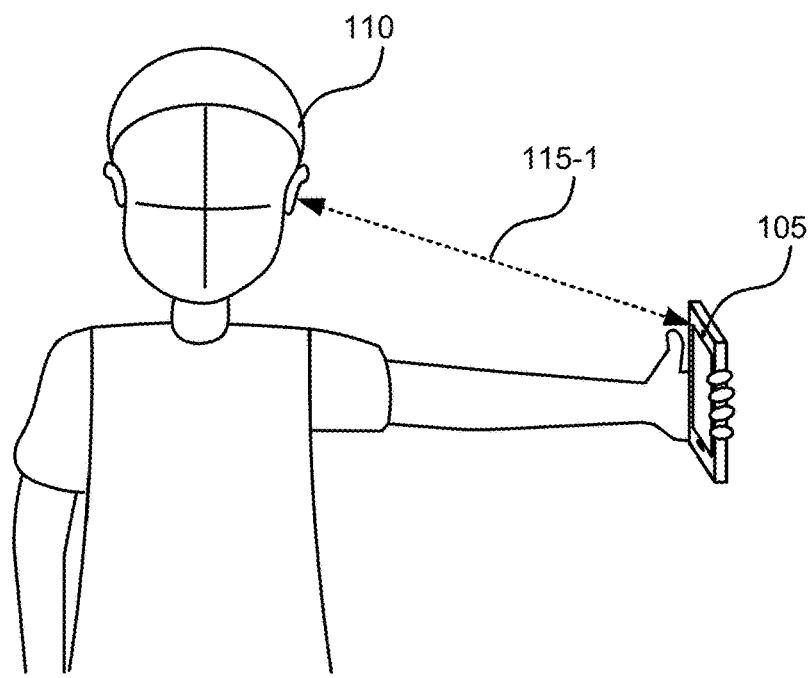
FIGS. 1A and 1B are simplified drawings provided to show an implementation of radar sensing, according to an embodiment.
Figure 1B:
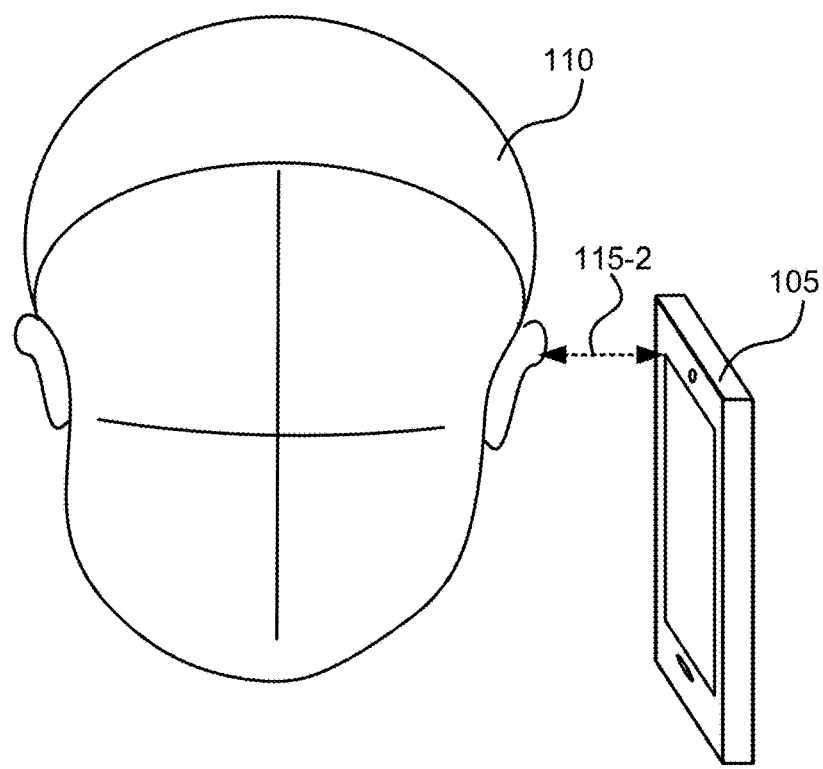

FIGS. 1A and 1B are simplified drawings provided to show an implementation of radar sensing, according to an embodiment. Here, a mobile device 105 can use a radar sensor to determine a distance between the mobile device 105 and a user 110. For simplicity, the mobile device 105 is illustrated as determining a distances 115-1 and 115-2 (collectively and generically referred to herein as distance 115) between the mobile device 105 and the user's ear positioned in front of the mobile device 105. This type of directionality of the proximity sensor may be achieved using leakage canceling techniques, such as those described herein below. However, it can be noted that such directionality may vary, depending on desired functionality.

The utilization of radar sensing for proximity determination in this manner can be useful, for a variety of reasons. Of particular relevance is the fact that many new modems are capable of performing radar sensing, in addition to providing data communication functionality. As such, embodiments employing radar sensing for proximity determination may not need a separate proximity sensor for proximity determinations.

As discussed in further detail herein, proximity determinations from radar sensing can be complicated by OTA leakage between the Tx and Rx sides of the radar sensor in the mobile device 105. RF signals travel at approximately 30 cm per nanosecond. And thus, the time it takes an RF signal transmitted by the mobile device 105 to reflect off of a user 110 (or other target) at a distance 115 on the order of tens of centimeters away will take only nanoseconds. This is typically far shorter than the time it takes to transmit a pulse for radar sensing (which can be, for example, on the order of a microsecond). As such, radar sensors need to operate in full-duplex mode, where the Rx side is activated to detect the reflected RF signal, or "echo," during at least a portion of the transmission of the RF signal by the Tx side. As such, the Rx side will likely detect OTA leakage, which is a portion of the RF signal transmitted directly from the Tx side to the Rx side.

While proximity determinations at tens of centimeters (e.g., FIG. 1A) may be distinguishable from OTA leakage in some cases, nearby proximity determinations (e.g., FIG. 1B) may be more difficult because the echo may be detected at approximately the same tap (or sampled time) as the OTA leakage. Again, additional details follow below. Embodiments provided herein can provide for OTA leakage cancellation that can mitigate problems due to OTA leakage for both relatively far (e.g., FIG. 1A) and relatively close (e.g., FIG. 1B) proximity determinations.

It can be noted that embodiments may not be limited to those illustrated in FIGS. 1A and 1B. Again, although radar sensing may be performed by communication hardware found in modern mobile phones, other devices may utilize the techniques provided herein. These can include, for example, other mobile devices (e.g., tablets, portable media players, laptops, wearable devices, virtual reality (VR) devices, augmented reality (AR) devices, etc.), as well as other electronic devices (e.g., security devices, on-vehicle systems, etc.).

Figure 2:
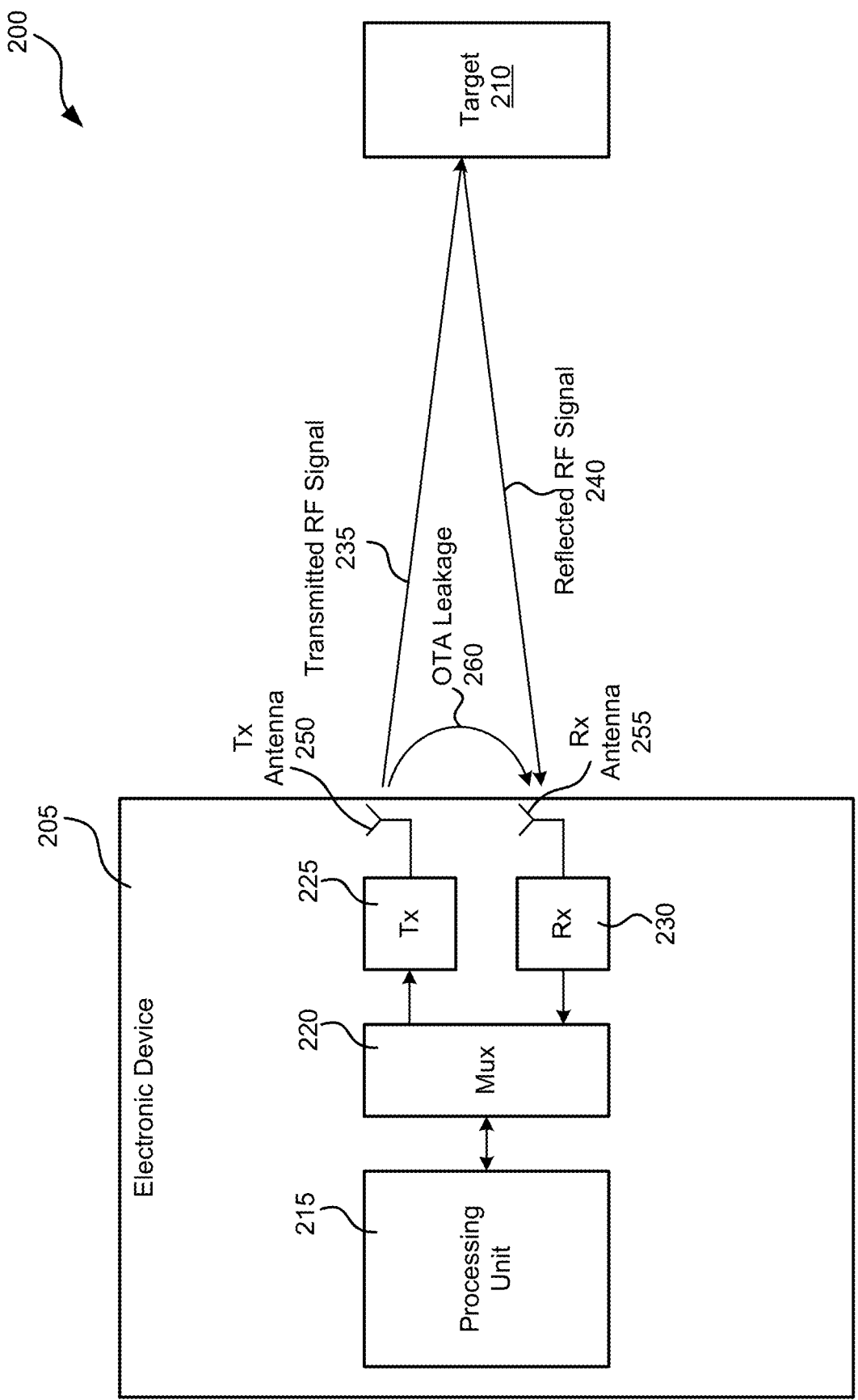
FIG. 2 is a block diagram of a radar sensor setup, provided to help illustrate the problem of OTA leakage in more detail.

FIG. 2 is a block diagram of a setup 200, provided to help illustrate the problem of OTA leakage in more detail. Here, the electronic device 205 may correspond with the mobile device 105 of FIGS. 1A and 1B, and target 210 may correspond to an object for which the electronic device 205 is performing proximity detection. As such, the electronic device 205 and target 210 may respectively correspond to the mobile device 105 and user 110 of FIGS. 1A and 1B.

Here, the electronic device 205 includes a processing unit 215, multiplexer 220, Tx processing circuitry 225, and Rx processing circuitry 230. The electronic device 205 may include additional components not illustrated, such as a power source, processing unit, user interface, etc. It can be noted, however, that these components of the electronic device 205 may be rearranged or otherwise altered in alternative embodiments, depending on desired functionality. Moreover, as used herein, the terms "transmit circuitry" or "Tx circuitry" refer to any circuitry utilized to create and/or transmit the transmitted RF signal 235. Likewise, the terms "receive circuitry" or "Rx circuitry" refer to any circuitry utilized to detect and/or process the reflected RF signal 240. As such, "transmit circuitry" and "receive circuitry" may not only comprise the Tx processing circuitry 225 and Rx processing circuitry 230 respectively, but may also comprise the mux 220 and processing unit 215. In some embodiments, the processing unit may compose at least part of a modem.

The Tx processing circuitry 225 and Rx circuitry 230 may comprise subcomponents for respectively generating and detecting RF signals. The person of ordinary skill in the art will appreciate, the Tx processing circuitry 225 may therefore include a pulse generator, digital-to-analog converter (DAC), a mixer (for up-mixing the signal to the transmit frequency), one or more amplifiers (for powering the transmission via Tx antenna 250), etc. The Rx processing circuitry 230 may have similar hardware for processing a detected RF signal. In particular, the Rx processing circuitry 230 may comprise an amplifier (for amplifying a signal received via Rx antenna 255), a mixer for down converting the received signal from the transmit frequency, and analog-to-digital converter (ADC) for digitizing the received signal, and a pulse correlator providing a matched filter for the pulse generated by the Tx processing circuitry 225. The Rx processing circuitry 230 may therefore use the correlator output as the channel impulse response (CIR), which can be processed by the processing unit 215 (or other circuitry) for leakage cancellation as described herein. Other processing of the CIR may also be performed, such as target detecting, range, speed, direction of arrival (DoA) estimation, etc.

They can be noted that the properties of the transmitted RF signal 235 may vary, depending on the technologies utilized. Techniques provided herein can apply generally to "mmWave" technologies, which range from 30 GHz to 300 GHz. This includes, for example, frequencies utilized by the 802.11ad Wi-Fi standard (operating at 60 GHz). Moreover, techniques may apply to RF signals comprising any of a variety of pulse types, including compressed pulses (e.g., comprising Chirp, Golay, Barker, or Ipatov sequences, etc.) may be utilized. That said, embodiments are not limited to such frequencies and/or pulse types.

FIG. 2 also illustrates OTA leakage 260, comprising a portion of the power of the transmitted RF signal 235 detected directly by the Rx antenna 255 without first reflecting from the target 210. As such, the OTA leakage 260 may be a much stronger signal than the reflected RF signal 240, and may be detected by the Rx antenna 255 prior to the detection of the reflected RF signal 240. An example of this is illustrated in FIG. 3.

Figure 3:
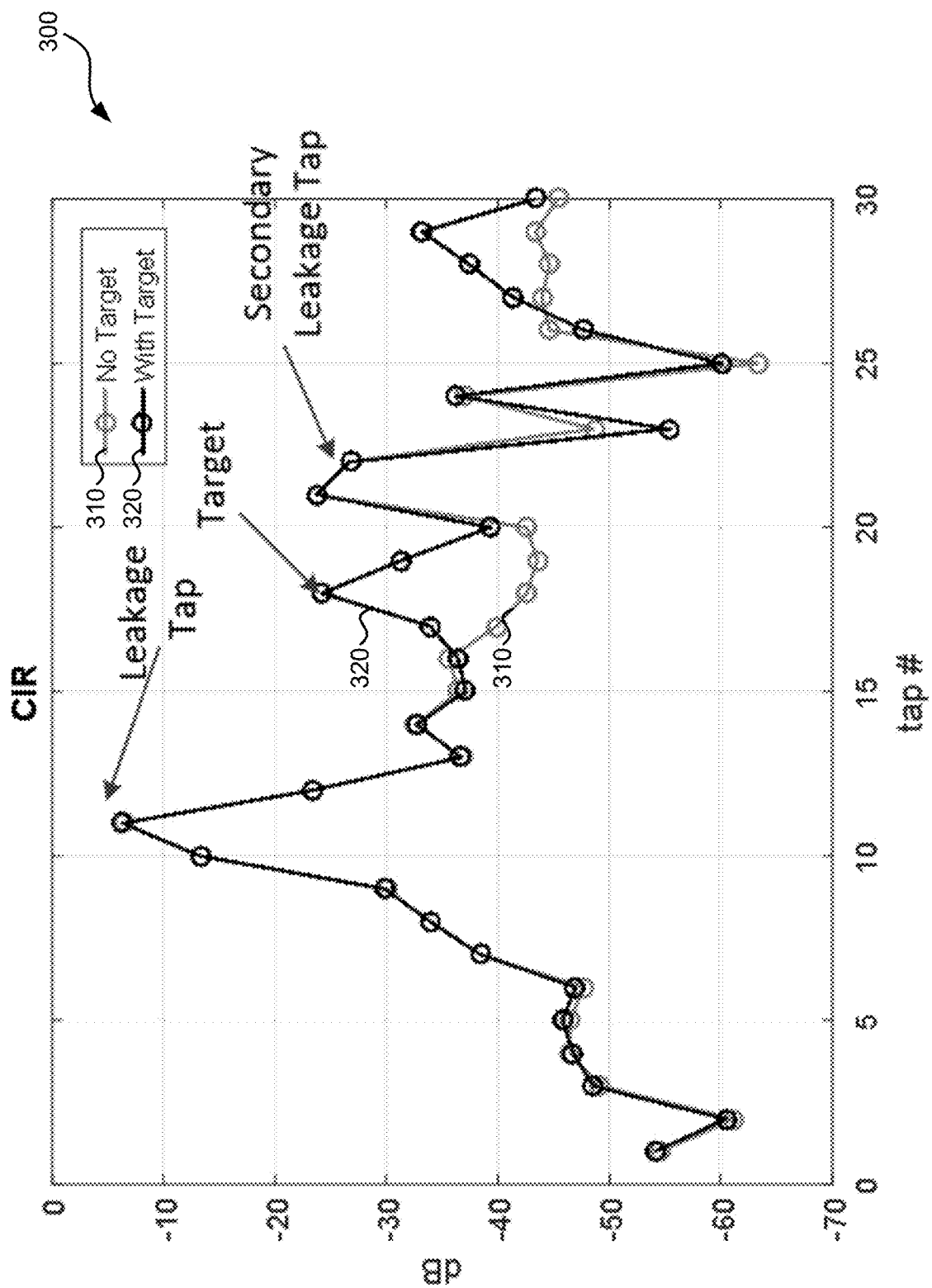
FIG. 3 is a graph of example measurements of the amplitude of the CIR over time.

FIG. 3 is a graph 300 of the amplitude of the CIR over time, in taps. The length of each tap is dependent on the bandwidth of the RF signal. Here, the bandwidth is 3.52 GHz. This results in taps representing 0.142 ns, giving a resolution between taps of 4.26 cm. The graph includes two plots: a first plot 310 showing the CIR with no target, and a second plot 320 showing a CIR with a target at 30 cm away from the electronic device 205. (The initial tap is chosen arbitrarily, as a point of reference.) As can be seen, the leakage tap (shown at #11) has much more power than the tap showing the reflection from the target (tap #18). Additionally, the CIR shows a secondary leakage tap (taps #21-22), which may be, for example, due to imprecise impedance matching within wiring of the Rx processing circuitry 230 and/or Tx processing circuitry 225.

As can be seen, given the leakage tap and the second leakage tap, detecting the target can be particularly difficult. Here, a target at a 30 cm distance provides a peak in the CIR power that, despite being 20 dB less than the leakage tap, may be distinguishable from the leakage tap and the secondary leakage tap. However, the target may not be as easily distinguishable at different distances. In particular, at short distances (e.g., distances of 5 cm or less, as shown in FIG. 1B), the peak corresponding to the target may overlap with the leakage tap itself, thereby making detection of a nearby target especially difficult.

To address this technical problem, embodiments can utilize antenna arrays to perform spatial leakage cancellation at the Tx or Rx side, to minimize OTA leakage 260 while maximizing power of the transmitted RF signal 235 directed toward the target 210, and/or power received from the reflected RF signal 240.

Figure 4:
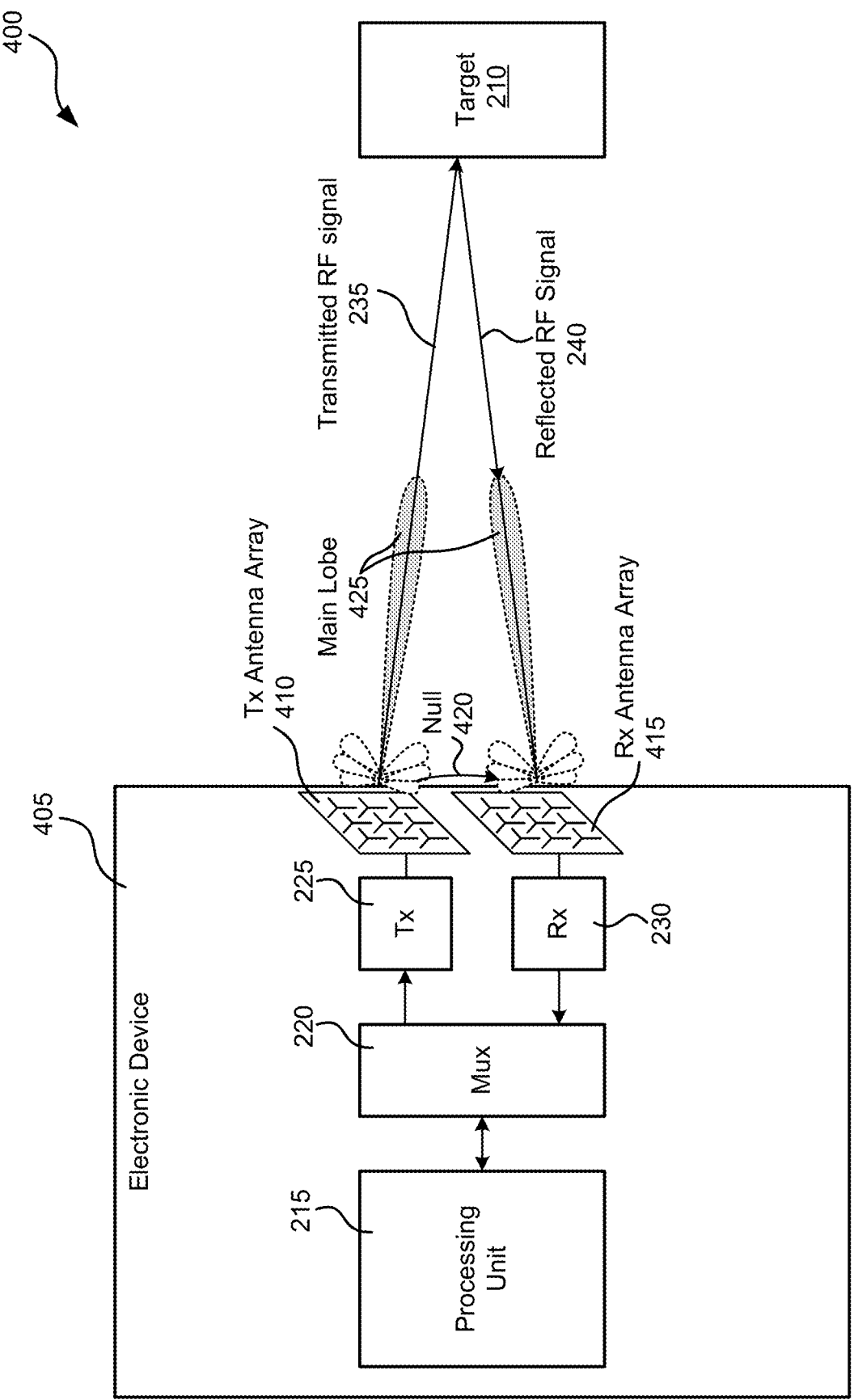
FIG. 4 is a block diagram of a setup for radar sensor proximity detecting, according to an embodiment.

FIG. 4 is a block diagram of a setup 400 for radar sensor proximity detecting, according to an embodiment. As can be seen, components are similar to the set of 200 of FIG. 2, and are labeled as such. Here, however, the electronic device 405 includes a Tx antenna array 410 and/or and Rx antenna array 415. Each antenna array 410, 415 comprises a plurality of antenna elements. It can be noted that, although the antenna arrays 410, 415 of FIG. 4 include two-dimensional arrays, embodiments are not so limited. Arrays may simply include a plurality of antenna elements along a single dimension that provides for spatial cancellation between the Tx and Rx sides of the electronic device 405. As a person of ordinary skill in the art will appreciate, the relative location of the Tx and Rx sides, in addition to various environmental factors can impact how spatial cancellation may be performed.

Put simply, the Tx antenna array 410 can allow the electronic device to perform leakage cancellation on the transmitted RF signal 235 to result in a beam pattern in which there is a minimum or null 420 along the direction of the OTA leakage. The beam pattern may additionally include a main lobe 425 directed outward toward the target 210. Such a beam pattern allows the electronic device 405 to maximize the transmitted RF signal 235 directed toward the target 210 while mitigating adverse effects from the OTA leakage. Additionally or alternatively, the Rx antenna array 415 can perform similar leakage cancellation on the Rx side, creating a minimum or null in the direction of the OTA leakage electromagnetic field, while directing the main lobe 425 outward toward the target 210. A person of ordinary skill in the art will appreciate that such leakage cancellation can be performed on the Tx side, on the Rx side, or both. Additionally or alternatively, leakage cancellation in this manner can be done via analog beamforming, digital leakage cancellation, or both.

Analog beamforming, for example, may comprise null steering in which Tx antenna array 410 and/or Rx antenna array 415 may be calibrated (when a target is not present) to measure respective Tx and/or Rx steering vectors in desired directions and the OTA leakage direction. A codebook weights vector can then be constructed to optimize sectors subject to a constraint of a null 420 (or minimum) in the direction of the OTA leakage. These beamforming weights can then be used during radar operation.

Analog beamforming in this manner can include any of a variety of benefits. For example, analog beamforming can improve the dynamic range of an analog-to-digital converter (ADC). However, performance of analog beamforming can be negatively affected by phase shifter quantization and amplitude tapering inaccuracy. Moreover, analog beamforming may be incapable of accommodating variations of the OTA leakage caused by environmental changes such as a change in temperature or mobile phone case replacement.

Digital leakage cancellation techniques, which can be performed in addition or as an alternative to analog beamforming, can be utilized in a generally similar manner. Various digital leakage cancellation techniques may be utilized. Two described herein include NSPC and MVDR beamforming.

For NSPC, an initial calibration includes measuring the CIR of each transmit/receive pair of antenna elements (or "Tx/Rx pair") when no target is present, to determine a reference OTA leakage. (This process is also referred to herein as a "calibration CIR measurement") Subsequently, during radar operation, the CIR of the target can be measured for each Tx/Rx pair for N antenna pairs. The model of a target CIR at a specific tap can then be described as:

$$x = c_L \cdot a_L + c_T \cdot a_T + n, \quad (1)$$

where $a_L$ is a steering vector of the leakage (with size N×1), $a_T$ is a steering vector of the target (with size N×1), $c_L$ is a complex scalar coefficient (magnitude and phase) of the OTA leakage, $c_T$ is a complex scalar coefficient (magnitude and phase) of the target, and n is a noise vector (with size N×1).

The projection can then be applied to the null space of the leakage steering vector using the projection matrix $P_{\perp a_L}$ as follows:

$$y = P_{\perp a_L} \cdot x = c_T \cdot P_{\perp a_L} \cdot a_T + \tilde{n}, \quad (2)$$

where $\tilde{n} = P_{\perp a_L} \cdot n$ is the noise vector projected to the null space leakage, and projection matrix $P_{\perp a_L}$ is an N×N matrix computed as follows:

$$P_{\perp a_L} = I - \frac{a_L \cdot a_L^H}{a_L^H a_L}. \quad (3)$$

Here I denotes identity matrix of size N×N. Note that this projection nulls out the leakage component $P_{\perp a_L} \cdot a_L = 0$.

Conventional beamforming can then be applied to y using normalized correlation with projected steering vectors, and the target can be determined as detected if a maximum of the beamformer output amplitude exceeds a threshold value. Moreover, the beamforming weight $a_k$ that maximizes this metric corresponds to the angle of arrival estimation:

$$\max_{a_k} \frac{|a_k^H y|}{\sqrt{a_k^H P_{\perp a_L} a_k}}. \quad (4)$$

It can be noted that some embodiments employing NSPC as described above may further engage in OTA leakage tracking, where additional CIR is measured when a target is not detected, allowing the reference OTA leakage CIR to be updated.

Figure 5:
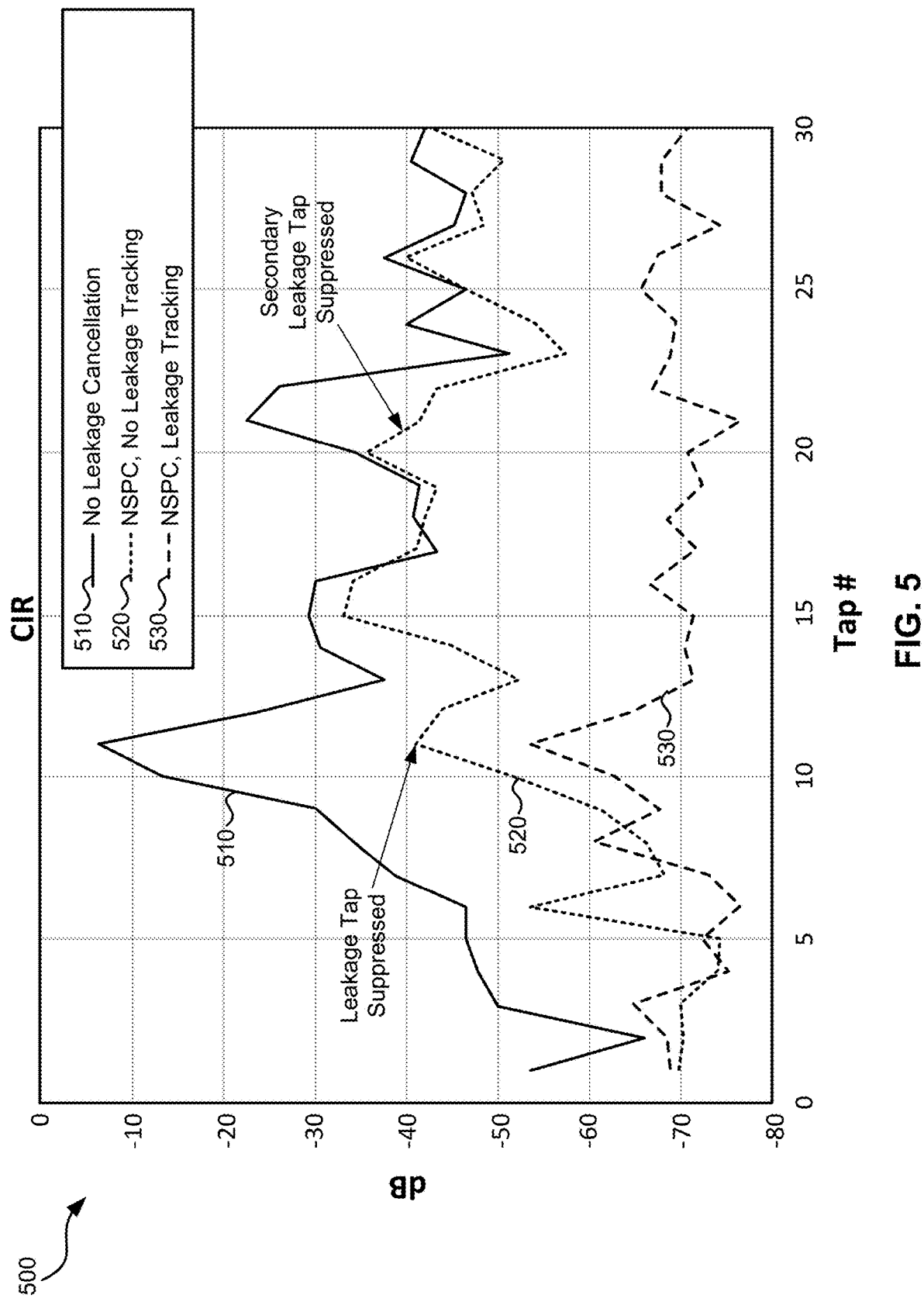
FIG. 5 is a graph plotting example measurements of CIR amplitude over time, according to an embodiment.

FIG. 5 is a graph 500, similar to graph 300 of FIG. 3, plotting CIR amplitude over time, provided here to illustrate how the NSPC form of leakage cancellation in the manner described above, can help reduce OTA leakage. It can be noted that, in contrast to FIG. 3, no target is present for the plotted CIR measurements.

The graph 500 includes three plots. The first plot 510 shows the CIR with no NSPC. The second plot 520 shows the CIR with NSPC, but without OTA leakage tracking. As can be seen, the second plot 520 has a greatly suppressed leakage tap (at tap #11) and secondary leakage tap (taps #21-22). The third plot 530, however, which shows the CIR after OTA leakage tracking, has a significantly lower noise floor, with a smaller variance. As can be seen, the third plot 530 never exceeds −50 dB.

Figure 6:
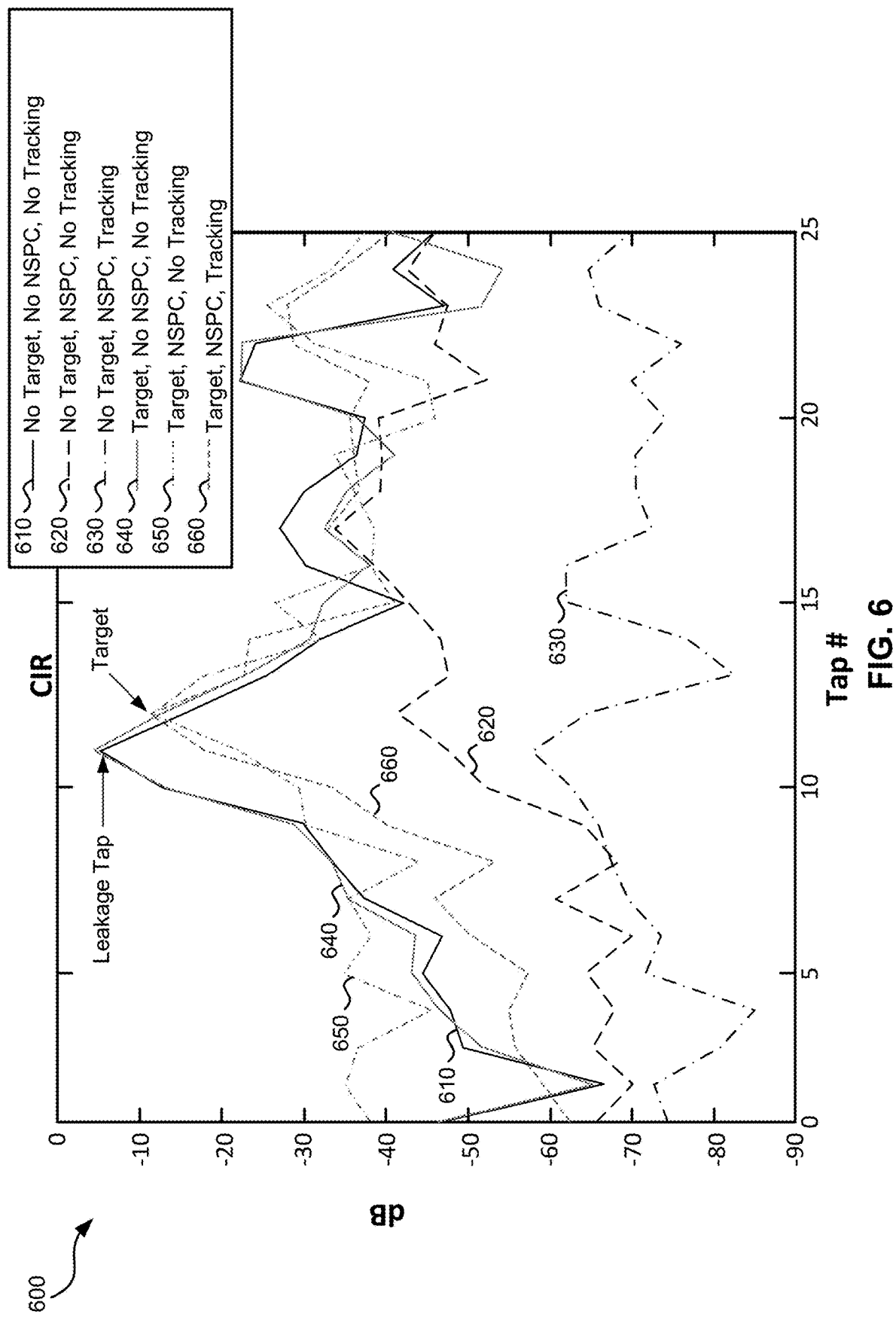
FIG. 6 is a graph plotting example measurements of CIR amplitude, but with additional plots to compare CIR data with and without a target present.

FIG. 6 is a graph 600, similar to graph 500 of FIG. 5, but with additional plots to compare CIR data with and without a target present. Importantly, the target here is relatively close—only 4.5 cm away—showing how NSPC and OTA tracking techniques provided herein can enable radar proximity detection in instances where radar proximity detection would otherwise be impossible.

Plots 610, 620, and 630 show CIR measurements with no target present. Similar to the graph 500 in FIG. 5, plot 610 shows the CIR with no NSPC performed, plot 620 shows CIR with NSPC but without OTA leakage tracking, and plot 630 shows the CIR with NSPC and OTA leakage tracking.

Plot 640, 650, and 660 show CIR measurements with a nearby target present. As can be seen in plot 640, which does not include NSPC or tracking, the leakage at tap #11 entirely masks the presence of the target at tap #12, which does not have a separately distinguishable peak. However, plot 650, which shows CIR after NSPC with no OTA leakage tracking, does have a distinguishable peak resulting from the target. Plot 660, which further includes OTA leakage tracking, also includes a peak due to the target. The peak from the target is the maximum amplitude (approximately −12 dB) for both plot 650 and 660. A good detection threshold may be able to distinguish between CIR without the target and CIR with the target. For plot 620 (no tracking), the values of CIR without target are remaining below approximately −35 dB, so a threshold value for detecting a target could be set at −35 dB, −30 dB, or (more conservatively) −25 dB, for example. But with tracking (plot 630), the detection threshold can be set to much lower values (e.g., −55 dB or −50 dB). This way tracking significantly improves detector sensitivity and enables detection of weak targets.

As noted above, a MVDR beamforming is a second type of digital leakage cancellation technique that may be used additionally or alternatively. According to such embodiments, the CIR of the target may be measured for each transmit/receive pair, using a train of M pulses. The model of a target CIR at a specific tap can again be described using equation (1) above. Here, however, x is a matrix of the measured CIR tap (with size N×M), $c_L$ and $c_T$ each has a size of 1×M, and n is a noise matrix (with size N×M).

Robust MVDR beamforming can then be applied using the regularization principle for adaptive leakage/interference cancellation. That is, for each direction $a_k$, optimal MVDR beamforming weights $w_k$ can be found using the following solution:

$$w_k = \operatorname*{argmin}_{w} \|w^H x\|^2 + \lambda \|w\|^2, \text{ s.t. } w^H a_k = 1, \quad (5)$$

where $$w_k^H = \frac{a_k^H R^{-1}}{a_k^H R^{-1} a_k}, \quad (6)$$

and $$R = x \cdot x^H + \lambda I. \quad (7)$$

Here I denotes the identity matrix and λ is empirically optimized regularization penalty term that compensates for the imperfections in the knowledge of the desired steering vectors and other model inaccuracies.

The direction with maximum beamforming output power can then be searched for as follows:

$$\max_{w_k} \|w_k^H x\|^2. \tag{8}$$

The beamforming weight that maximizes this metric corresponds to the angle of arrival estimation. Again, target detection occurs when a maximum amplitude exceeds a threshold value. Using MVDR in this manner, OTA leakage can be canceled out adaptively without the need to estimate it.

Figure 7:
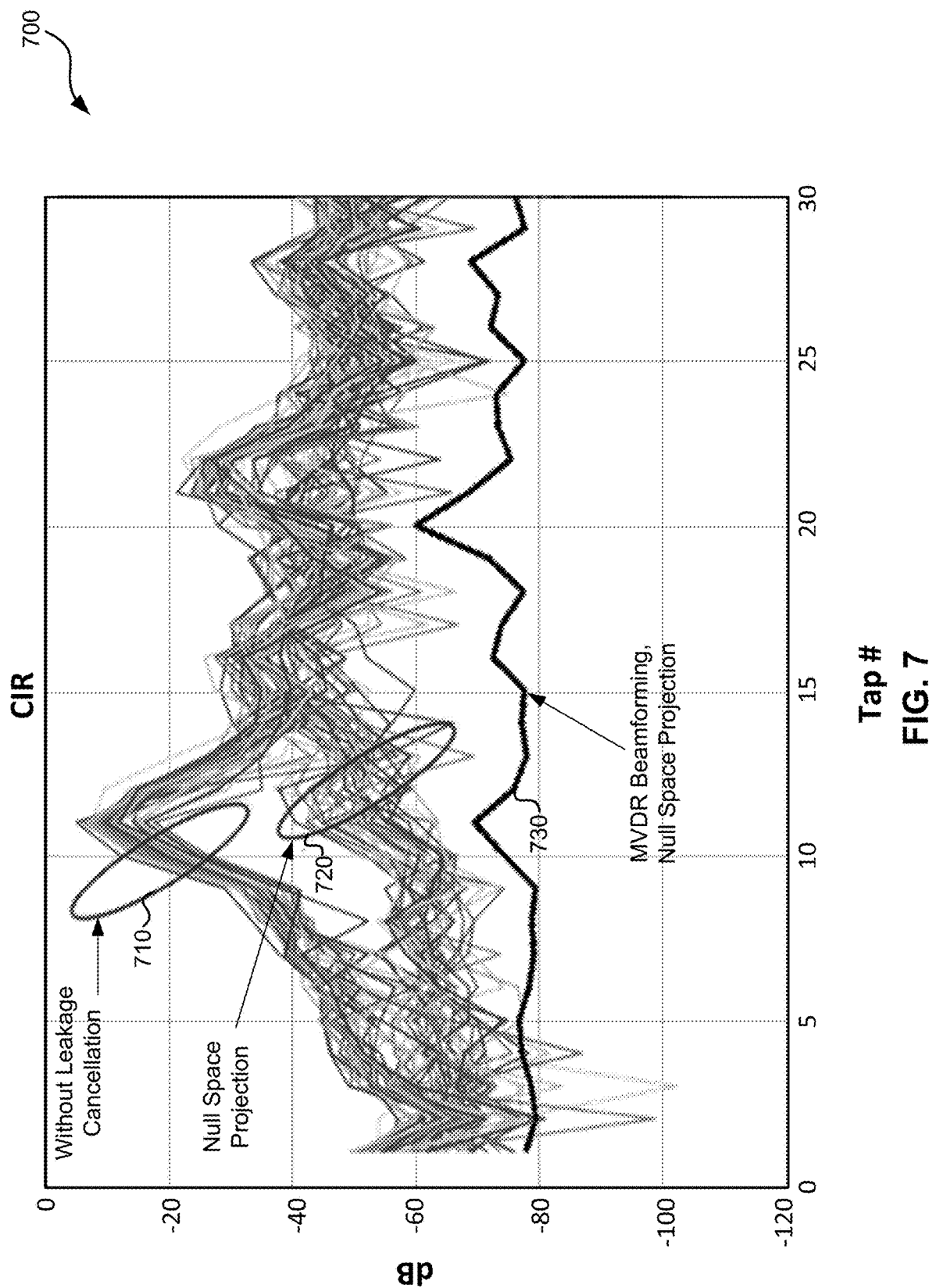
FIG. 7 is a graph plotting CIR amplitude over time, according to an embodiment, showing how both null space projection and MVDR forms of leakage cancellation can be used to reduce OTA leakage.

FIG. 7 is a graph 700, similar to those on FIGS. 3 and 5, plotting CIR amplitude over time, provided here to illustrate how both NSPC and MVDR beamforming forms of leakage cancellation can be used to reduce OTA leakage. As with FIG. 5, no target is present for the plotted CIR measurements. Graph 700 shows measurement results for hardware with a Tx side having a single Tx antenna, and an Rx side having an array of 32 antenna elements, resulting in 32 transmit/receive pairs of antenna elements.

A first set of plots 710 shows CIR measurements for each of the 32 transmit/receive pairs where no NSPC is performed. This is analogous to plot 510 in FIG. 5. A second set of plots 720 shows CIR measurements for each of the 32 transmit/receive pairs where NSPC is used for leakage cancellation. This is analogous to plot 520 of FIG. 5. (As can be seen, OTA leakage is reduced in a manner similar to the reduction found in plot 520.) Finally, plot 730 illustrates the CIR when MVDR beamforming is additionally applied. Here, the power is significantly reduced, peaking at −60 dB. As such, a threshold value for detecting a target could be, for example, −50 dB.

It can be noted that alternative embodiments may employ leakage cancellation in different ways. As previously noted, the methods for analog beamforming and/or digital leakage cancellation provided herein can be used in any combination. In some embodiments, instead of using single antenna pairs, digital leakage cancellation can work on transmit/receive sector pairs, where sectors can be treated as directional antennas and sector responses are measured rather than the antenna responses.

Figure 8:
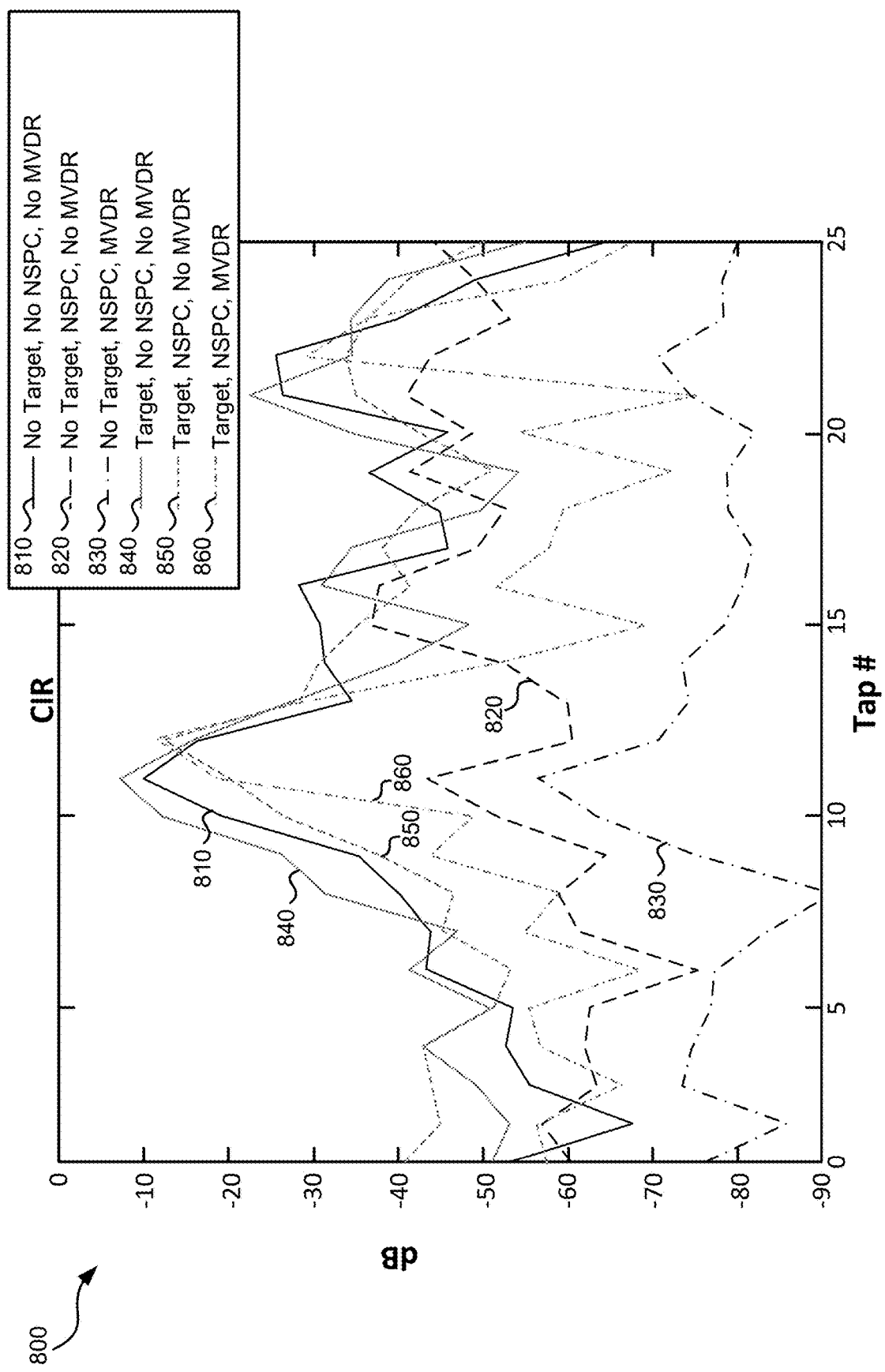
FIG. 8 plotting CIR amplitude both with and without a target present.

FIG. 8 is a graph 800, similar to graph 600 of FIG. 6, allowing for a comparison of plots both with and without a target present (again at a distance of 4.5 cm away, shown at tap #12). Here, however, rather than showing plots with and without OTA leakage tracking, the graph 800 shows plots with and without MVDR beamforming.

Plots 810, 820, and 830 show CIR measurements with no target present. Similar to the graph 500 in FIG. 5, plot 810 shows the CIR with no NSPC, plot 820 shows CIR with NSPC but without MVDR beamforming, and plot 830 shows the CIR with NSPC and MVDR beamforming.

Plot 840, 850, and 860 show CIR measurements with a nearby target present. Similar to the graph 600 of FIG. 6, plot 840 does not include NSPC or MVDR, and the leakage at tap #11 entirely masks the presence of the target at tap #12. On the other hand, plot 850, which shows CIR after NSPC with no MVDR, does have a distinguishable peak resulting from the target. Plot 860, which further includes MVDR, also includes a peak due to the target. The peak from the target is the maximum amplitude (approximately −12 dB) for both plot 850 and 860. Comparing plots with no target 820 (with NSPC but without MVDR) and 830 (with NSPC and MVDR), we can see that CIR values in 830 have much lower values than in 820. As noted previously, a good detection threshold may be able to distinguish between CIR without the target and CIR with the target. Therefore, the detection threshold with MVDR can be much lower enabling detection of much weaker targets.

Figure 9:
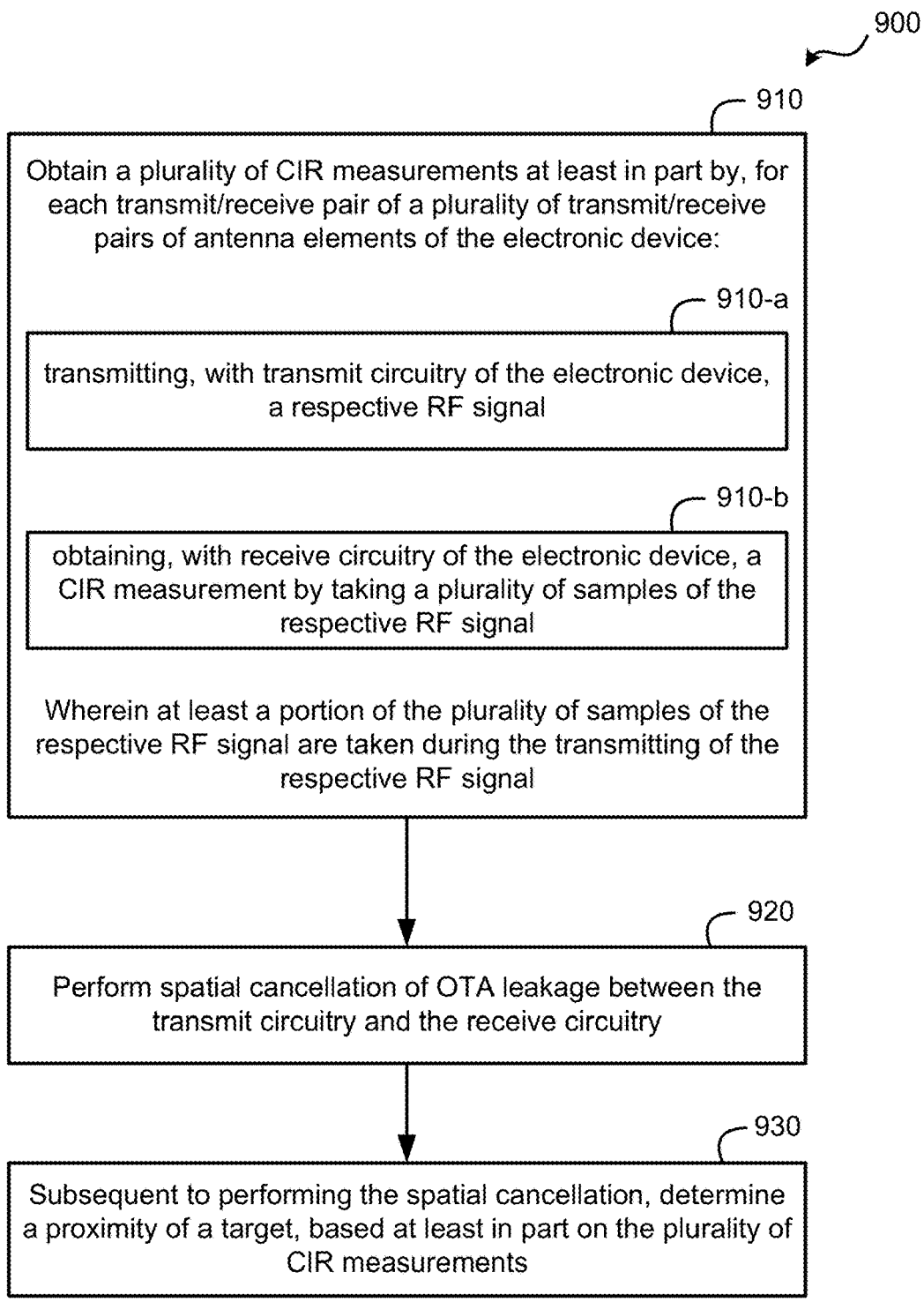
FIG. 9 is a flow diagram of a method of performing proximity detection using RF signals at an electronic device, according to an embodiment.

FIG. 9 is a flow diagram of a method 900 of performing proximity detection using RF signals at an electronic device, according to an embodiment. The method 900 captures a portion of the functionality described in the embodiments above and illustrated in FIGS. 1-8. One or more of the functions described in the blocks illustrated in FIG. 9 may be performed by software and/or hardware components, such as one or more components of an electronic device 405 as illustrated in FIG. 4, or, more generally, one or more components of the electronic device 1000 illustrated in FIG. 10 and described below. Moreover, a person of ordinary skill in the art will appreciate that alternative embodiments may vary in the way they implement the functions illustrated in FIG. 9 by adding, omitting, combining, separating, and otherwise varying the functions illustrated in the blocks of FIG. 9.

At block 910, a plurality of CIR measurements is obtained at least in part by, for each transmit/receive pair of a plurality of transmit/receive pairs of antenna elements of the electronic device, performing the functions of blocks 910-*a* and 910-*b*. The function at 910-*a* comprises transmitting, with transmit circuitry of the electronic device, a respective RF signal. At block 910-*b*, the function comprises obtaining, with receive circuitry of the electronic device, a CIR measurements by taking a plurality of samples of the respective RF signal. Here, at least a portion of the plurality of samples of the respective RF signal are taken during the transmitting of the respective RF signal. As noted in the embodiments above, the RF signal can comprise any of a variety of pulse types. Moreover, pulse may be included in a data packet (e.g., a designated field within a 802.11ad or 802.11ay packet). As illustrated in FIG. 7, for example, CIR measurements can be taken for each transmit/receive pair, where each CIR measurement is obtained by taking a plurality of samples (e.g., taps). At least a portion of the these samples may be taken during the transmitting of the respective RF signal (e.g., in full-duplex mode).

As previously noted, embodiments may include a plurality of antenna elements at the transmit side and/or receive side. As such, the plurality of transmit/receive pairs of antenna elements may comprise a plurality of receive antenna elements within the receive circuitry, or a plurality of transmit antenna elements within the transmit circuitry, or both. Moreover, according to some embodiments, the plurality of transmit antenna elements may comprise all or a portion of the antenna elements of a transmitter antenna array (e.g., the Tx antenna array 410 of FIG. 4). Similarly, the plurality of receive antenna elements may comprise all or a portion of the antenna elements of a receive antenna array (e.g., Rx antenna array 415 of FIG. 4).

Figure 10:
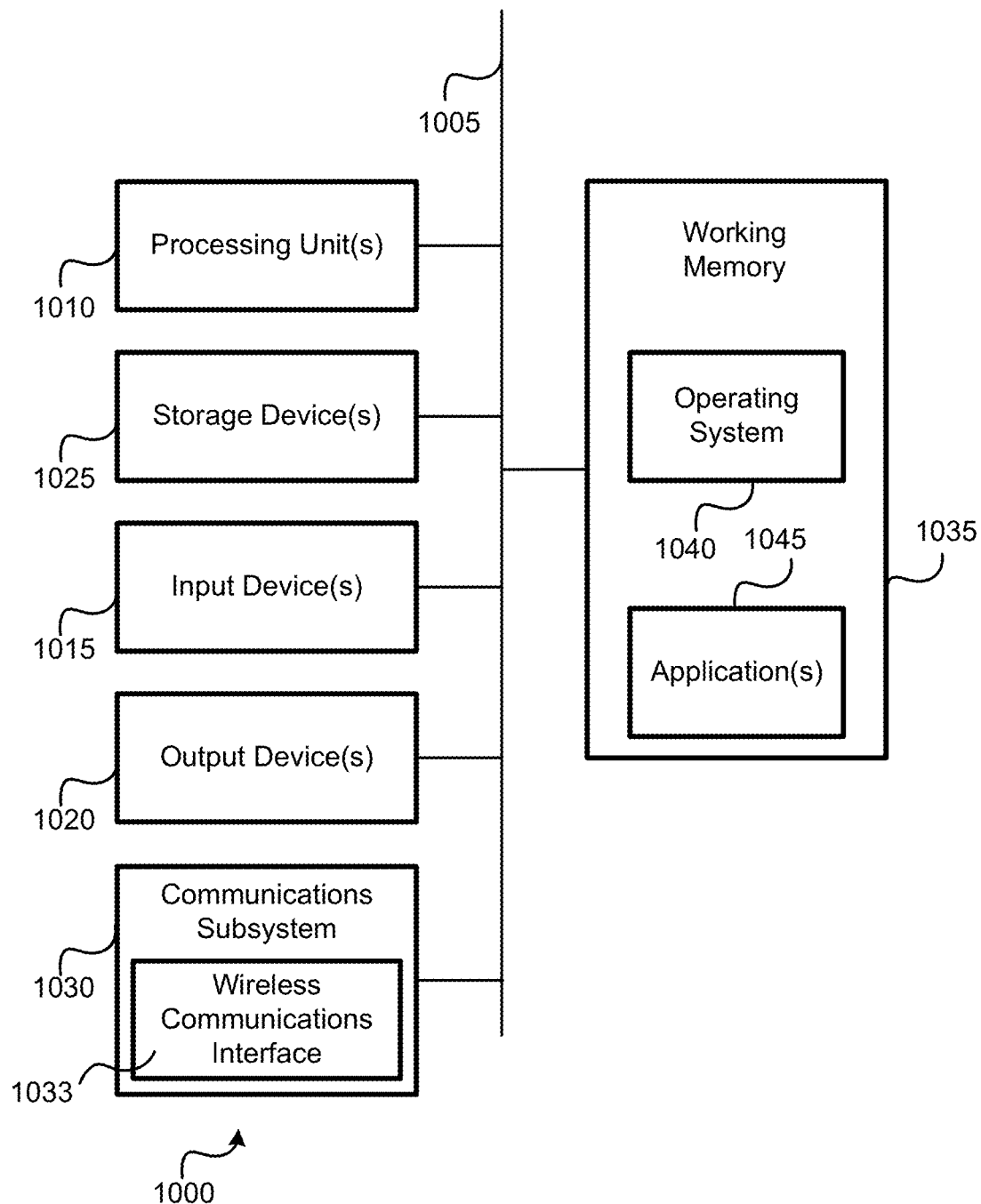
FIG. 10 is a block diagram of an electronic device, according to an embodiment.

Means for performing the functionality at block 910 may include, for example, a bus 1005, processing unit(s) 1010, memory 1035, communications subsystem 1030 (including wireless communication interface 1033), and/or other hardware and/or software components of an electronic device 1000 as illustrated in FIG. 10 and described in further detail below.

At block 920, the functionality includes performing spatial cancellation of OTA leakage between the transmit circuitry in the receive circuitry. As noted in the embodiments described herein above, such spatial cancellation may comprise analog beamforming, digital leakage cancellation, or both. Moreover, leakage cancellation may be performed using the transmit circuitry, the receive circuitry, or both. According to some embodiments, performing the spatial cancellation may comprise performing analog beamforming in which a minimum in the power radiated, received, or both, occurs in the direction of the OTA leakage. Additionally or alternatively, performing the spatial cancellation may comprise performing NSPC in which, prior to obtaining the plurality of proximity detection samples, a CIR is measured when the target is not detected, a steering vector of OTA leakage direction is determined based on the CIR measurement, and the digital leakage cancellation is performed using the projection to a null space of the leakage steering vector. Some embodiments may further comprise performing OTA leakage tracking by measuring the CIR subsequent to performing the digital leakage cancellation and updating leakage steering vector if target has not been detected. Additionally or alternatively, the spatial cancellation may comprise performing digital beamforming using an MVDR beamformer.

Means for performing the functionality at block 920 may include, for example, a bus 1005, processing unit(s) 1010, memory 1035, communications subsystem 1030, and/or other hardware and/or software components of an electronic device 1000 as illustrated in FIG. 10 and described in further detail below.

At block 930, the functionality includes, subsequent to performing the spatial cancellation, determining a proximity of the target, based at least in part on the plurality of CIR measurements. As noted in the embodiments above, spatial cancellation can reduce OTA leakage sufficiently to allow target detection when a CIR maximum amplitude exceeds a threshold value. The proximity of the target can be determined based on the sample (e.g., tap #) at which this maximum is detected. As noted above, the granularity of these samples may be based on bandwidth, where an increase in bandwidth results in a more granular distance information.

Means for performing the functionality at block 930 may include, for example, a bus 1005, processing unit(s) 1010, memory 1035, and/or other hardware and/or software components of an electronic device 1000 as illustrated in FIG. 10 and described in further detail below.

FIG. 10 illustrates an embodiment of an electronic device 1000, which may incorporate a radar sensor for proximity detection as described in the embodiments above. FIG. 10 provides a schematic illustration of one embodiment of an electronic device 1000 that can perform the methods provided by various other embodiments, such as the methods described in FIG. 9. Moreover, the electronic device 1000 of FIG. 10 may correspond to other electronic devices described herein, including electronic device 405 illustrated in FIG. 4. As such, the various components illustrated in FIG. 10 of the electronic device 1000 may correspond to an/or incorporate the components of the electronic device 405 illustrated in FIG. 4. Moreover, the electronic device 1000 may comprise and/or be incorporated into any of a variety of devices, including a mobile phone, tablet, personal computer (PC), laptop, security device (e.g., camera, floodlight, etc.), and/or the like It is noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical or geographical locations.

The electronic device 1000 is shown comprising hardware elements that can be electrically coupled via a bus 1005 (or may otherwise be in communication, as appropriate). The hardware elements may include processing unit(s) 1010, which can include without limitation one or more general-purpose processors, one or more special-purpose processors (such as a Digital Signal Processor (DSP), Graphics Processing Unit (GPU), Application-Specific Integrated Circuit (ASIC), Field-Programmable Gate Array (FPGA), and/or the like), and/or other processing structure, which can be configured to perform one or more of the methods described herein, including the method described in relation to FIG. 10. The electronic device 1000 also can include one or more input devices 1015, which can include without limitation a mouse, a keyboard, a camera, a microphone, and/or the like; and one or more output devices 1020, which can include without limitation a display device, a printer, and/or the like.

The electronic device 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The electronic device 1000 may also include a communications subsystem 1030, which can include support of wireline communication technologies and/or wireless communication technologies (in some embodiments) managed and controlled by a wireless communication interface 1033. The communications subsystem 1030 may include a modem, a network card (wireless or wired), an infrared communication device, a wireless communication device, and/or a chipset, and/or the like. The communications subsystem 1030 may include one or more input and/or output communication interfaces, such as the wireless communication interface 1033, to permit data and signaling to be exchanged with a network, mobile devices, and/or other electronic devices. As previously noted, a radar sensor may be incorporated into a wireless communications interface 1033 such that antenna elements in a transmitter antenna array (e.g. Tx antenna array 410) and receiver antenna array (e.g., Rx antenna array 415), and the circuitry connected with the antenna elements (e.g., mux 220 and processing unit 215), may be used for both proximity detection and data communication. For example, in some embodiments, the wireless communication interface 1033 may comprise a 802.11ad- and/or 802.11ay-compatible modem capable of both RF imaging and data communication. Alternatively, a radar sensor and accompanying circuitry may be separate from the communications subsystem 1030. In such embodiments, the radar sensor may be utilized as an input device 1015.

In many embodiments, the electronic device 1000 will further comprise a working memory 1035, which can include a RAM and/or or ROM device. Software elements, shown as being located within the working memory 1035, can include an operating system 1040, device drivers, executable libraries, and/or other code, such as application(s) 1045, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 9, may be implemented as code and/or instructions that are stored (e.g. temporarily) in working memory 1035 and are executable by a computer (and/or a processing unit within a computer such as processing unit(s) 1010); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as electronic device 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 1000 and/or might take the form of source and/or installable code, which, upon compilation and/or installation on the electronic device 1000 (e.g., using any of a variety of generally available compilers, installation programs, compression/decompression utilities, etc.), then takes the form of executable code.

It can be noted that, although particular frequencies, integrated circuits (ICs), hardware, and other features are described in the embodiments herein, alternative embodiments may vary. That is, alternative embodiments may utilize additional or alternative frequencies (e.g., other the 60 GHz and/or 28 GHz frequency bands, or even outside mmWave frequencies (30 GHz to 300 GHz), antenna elements (e.g., having different size/shape of antenna element arrays), scanning periods (including both static and dynamic scanning periods), electronic devices (e.g., mobile phones, tablets, personal computer (PC), etc.), and/or other features. A person of ordinary skill in the art will appreciate such variations.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a Programmable ROM (PROM), Erasable PROM (EPROM), a flash-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It will be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it is noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of performing proximity detection using radio frequency (RF) signals at an electronic device, the method comprising:
obtaining a plurality of Channel Impulse Response (CIR) measurements at least in part by, for each transmit/receive pair of a plurality of transmit/receive pairs of antenna elements of the electronic device:
transmitting, with transmit circuitry of the electronic device, a respective RF signal, and
obtaining, with receive circuitry of the electronic device, a CIR measurement at least in part by taking a plurality of samples of the respective RF signal, wherein at least a portion of the plurality of samples of the respective RF signal are taken during the transmitting of the respective RF signal;
performing spatial cancellation of Over The Air (OTA) leakage between the transmit circuitry and the receive circuitry at least in part by:
determining, based on the CIR measurement, a leakage steering vector in a direction of the OTA leakage between a transmit/receive pair of the plurality of transmit/receive pairs of the antenna elements of the electronic device;
determining a projection to a null space in a direction of the leakage steering vector based on the direction of the OTA leakage; and
canceling at least a portion of the OTA leakage based on the projection to the null space in the direction of the leakage steering vector; and
subsequent to performing the spatial cancellation, determining a proximity of a target, based at least in part on the plurality of CIR measurements.

2. The method of claim 1, wherein the projection to the null space is determined based on at least a complex scalar coefficient associated with a target, a projection matrix associated with the leakage steering vector, a steering vector associated with the target, and a noise vector projected to the null space in the direction of the leakage steering vector.

3. The method of claim 1, wherein performing the spatial cancellation comprises:
performing leakage cancellation using the transmit circuitry, or
performing leakage cancellation using the receive circuitry, or
both.

4. The method of claim 3, wherein performing the spatial cancellation comprises performing analog beamforming in which a minimum in power radiated, received, or both, occurs in a direction of the OTA leakage.

5. The method of claim 3, wherein performing the spatial cancellation comprises performing digital leakage cancellation in which:
prior to obtaining the plurality of CIR measurements, a calibration CIR measurement is taken when the target is not detected.

6. The method of claim 5, further comprising:
performing OTA leakage tracking at least in part by taking one or more additional calibration CIR measurements subsequent to performing the digital leakage cancellation; and
updating the leakage steering vector in the direction of the OTA leakage when the target is not detected.

7. The method of claim 3, wherein performing the spatial cancellation comprises performing digital beamforming using a minimum variance distortionless response (MVDR) beamformer.

8. An electronic device for performing proximity detection using radio frequency (RF) signals, the electronic device comprising:
antenna elements comprising:
one or more transmit antenna elements, and
one or more receive antenna elements,
wherein the one or more transmit antenna elements and the one or more receive antenna elements comprise a plurality of transmit/receive pairs of antenna elements;
transmit circuitry communicatively coupled with the one or more transmit antenna elements;
receive circuitry communicatively coupled with the one or more receive antenna elements; and
a processing unit communicatively coupled with the transmit circuitry and receive circuitry and configured to:
obtain a plurality of Channel Impulse Response (CIR) measurements at least in part by, for each transmit/receive pair of a plurality of transmit/receive pairs of antenna elements of the electronic device:
causing the transmit circuitry to transmit a respective RF signal, and
causing the receive circuitry to obtain a CIR measurement at least in part by taking a plurality of samples of the respective RF signal, wherein at least a portion of the plurality of samples of the respective RF signal are taken during the transmission of the respective RF signal;
perform spatial cancellation of Over The Air (OTA) leakage between the transmit circuitry and the receive circuitry at least in part by:
determining, based on the CIR measurement, a leakage steering vector in a direction of the OTA leakage between a transmit/receive pair of the plurality of transmit/receive pairs of the antenna elements of the electronic device;
determining a projection to a null space in a direction of the leakage steering vector based on the direction of the OTA leakage; and
canceling at least a portion of the OTA leakage based on the projection to the null space in the direction of the leakage steering vector; and
subsequent to performing the spatial cancellation, determine a proximity of a target, based at least in part on the plurality of CIR measurements.

9. The electronic device of claim 8, wherein the processing unit composes at least part of a modem.

10. The electronic device of claim 8, wherein the projection to the null space is determined based on at least a complex scalar coefficient associated with a target, a projection matrix associated with the leakage steering vector, a steering vector associated with the target, and a noise vector projected to the null space in the direction of the leakage steering vector.

11. The electronic device of claim 8, wherein, to perform the spatial cancellation, the processing unit is configured to:
perform leakage cancellation using the transmit circuitry, or
perform leakage cancellation using the receive circuitry, or
both.

12. The electronic device of claim 11, wherein, to perform the spatial cancellation, the processing unit is configured to perform analog beamforming in which a minimum in power radiated, received, or both, occurs in a direction of the OTA leakage.

13. The electronic device of claim 11, wherein, to perform the spatial cancellation, the processing unit is configured to perform digital leakage cancellation at least in part by:
prior to obtaining the plurality of CIR measurements, taking a calibration CIR measurement when the target is not detected.

14. The electronic device of claim 13, wherein the processing unit is further configured to:
perform OTA leakage tracking at least in part by taking one or more additional calibration CIR measurements subsequent to performing the digital leakage cancellation; and
update the leakage steering vector in the direction of the OTA leakage when the target is not detected.

15. The electronic device of claim 11, wherein, to perform the spatial cancellation, the processing unit is configured to perform digital beamforming using a minimum variance distortionless response (MVDR) beamformer.

16. A device for performing proximity detection using radio frequency (RF) signals, the device comprising:
means for obtaining a plurality of Channel Impulse Response (CIR) measurements at least in part by, for each transmit/receive pair of a plurality of transmit/receive pairs of antenna elements of the device:
transmitting, with transmission means of the device, a respective RF signal, and
obtaining, with reception means of the device, a CIR measurement at least in part by taking a plurality of samples of the respective RF signal, wherein at least a portion of the plurality of samples of the respective RF signal are taken during the transmitting of the respective RF signal;
means for performing spatial cancellation of Over The Air (OTA) leakage between the transmission means and the reception means at least in part by:
determining, based on the CIR measurement, a leakage steering vector in a direction of the OTA leakage between a transmit/receive pair of the plurality of transmit/receive pairs of the antenna elements of the device;
determining a projection to a null space in a direction of the leakage steering vector based on the direction of the OTA leakage; and
canceling at least a portion of the OTA leakage based on the projection to the null space in the direction of the leakage steering vector; and
means for determining a proximity of a target, subsequent to performing the spatial cancellation, based at least in part on the plurality of CIR measurements.

17. The device of claim 16, wherein the projection to the null space is determined based on at least a complex scalar coefficient associated with a target, a projection matrix associated with the leakage steering vector, a steering vector associated with the target, and a noise vector projected to the null space in the direction of the leakage steering vector.

18. The device of claim 16, wherein the means for performing the spatial cancellation comprise:
means for performing leakage cancellation using the transmission means, or
means for performing leakage cancellation using the reception means, or
both.

19. The device of claim 18, wherein the means for performing the spatial cancellation comprises means for performing analog beamforming in which a minimum in power radiated, received, or both, occurs in a direction of the OTA leakage.

20. The device of claim 18, wherein the means for performing the spatial cancellation comprises means for performing digital leakage cancellation in which:
prior to obtaining the plurality of CIR measurements, a calibration CIR measurement is taken when the target is not detected.

21. The device of claim 20, further comprising means for performing OTA leakage tracking at least in part by taking one or more additional calibration CIR measurements subsequent to performing the digital leakage cancellation and updating the leakage steering vector in the direction of the OTA leakage when the target is not detected.

22. The device of claim 18, wherein the means for performing the spatial cancellation comprises means for performing digital beamforming using a minimum variance distortionless response (MVDR) beamformer.

23. A non-transitory computer-readable medium having instructions stored therein for performing proximity detection using radio frequency (RF) signals, the instructions, when executed by one or more processing units, cause the one or more processing units to:
obtain a plurality of Channel Impulse Response (CIR) measurements at least in part by, for each transmit/receive pair of a plurality of transmit/receive pairs of antenna elements of an electronic device:
transmitting, with transmit circuitry of the electronic device, a respective RF signal, and
obtaining, with receive circuitry of the electronic device, a CIR measurement at least in part by taking a plurality of samples of the respective RF signal, wherein at least a portion of the plurality of samples of the respective RF signal are taken during the transmitting of the respective RF signal;
perform spatial cancellation of Over The Air (OTA) leakage between the transmit circuitry and the receive circuitry at least in part by:
determining a leakage steering vector based on the CIR measurement and in a direction of the OTA leakage between a transmit/receive pair of the plurality of transmit/receive pairs of the antenna elements of the electronic device;
determining a projection to a null space in a direction of the leakage steering vector based on the direction of the OTA leakage; and
canceling at least a portion of the OTA leakage based on the projection to the null space in the direction of the leakage steering vector; and
determine a proximity of a target, subsequent to performing the spatial cancellation, based at least in part on the plurality of CIR measurements.

24. The non-transitory computer-readable medium of claim 23, wherein, to perform the spatial cancellation, the instructions, when executed by one or more processing units, cause the one or more processing units to:
perform leakage cancellation using the transmit circuitry, or
perform leakage cancellation using the receive circuitry, or
both.

25. The non-transitory computer-readable medium of claim 24, wherein, to perform the spatial cancellation, the instructions, when executed by one or more processing units, cause the one or more processing units to perform analog beamforming in which a minimum in power radiated, received, or both, occurs in a direction of the OTA leakage.

26. The non-transitory computer-readable medium of claim 24, wherein, to perform the spatial cancellation, the instructions, when executed by one or more processing units, cause the one or more processing units to perform digital leakage cancellation in which:
   prior to obtaining the plurality of CIR measurements, a calibration CIR measurement is taken when the target is not detected.

27. The non-transitory computer-readable medium of claim 26, further comprising instructions that, when executed by one or more processing units, cause the one or more processing units to:
   perform OTA leakage tracking at least in part by taking one or more additional calibration CIR measurements subsequent to performing the digital leakage cancellation; and
   update the leakage steering vector in the direction of the OTA leakage when the target is not detected.

28. The non-transitory computer-readable medium of claim 23, wherein the projection to the null space is determined based on at least a complex scalar coefficient associated with a target, a projection matrix associated with the leakage steering vector, a steering vector associated with the target, and a noise vector projected to the null space in the direction of the leakage steering vector.

\* \* \* \* \*